Figure 1:
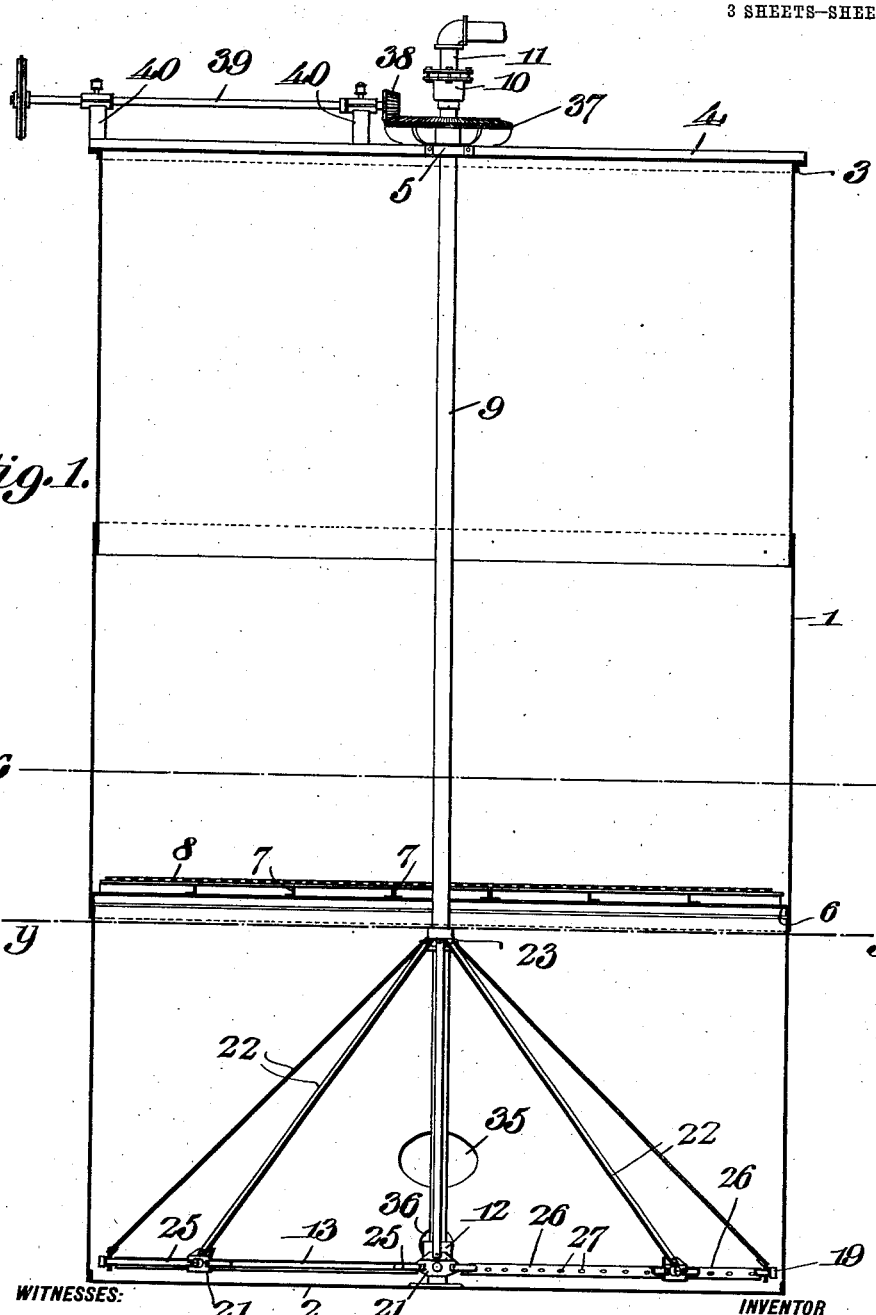

C. W. EWING.
CHEMICAL MIXER.
APPLICATION FILED APR. 30, 1913.

1,111,788.

Patented Sept. 29, 1914.
3 SHEETS—SHEET 1.

WITNESSES:

INVENTOR
Claud W. Ewing.
BY
ATTORNEY

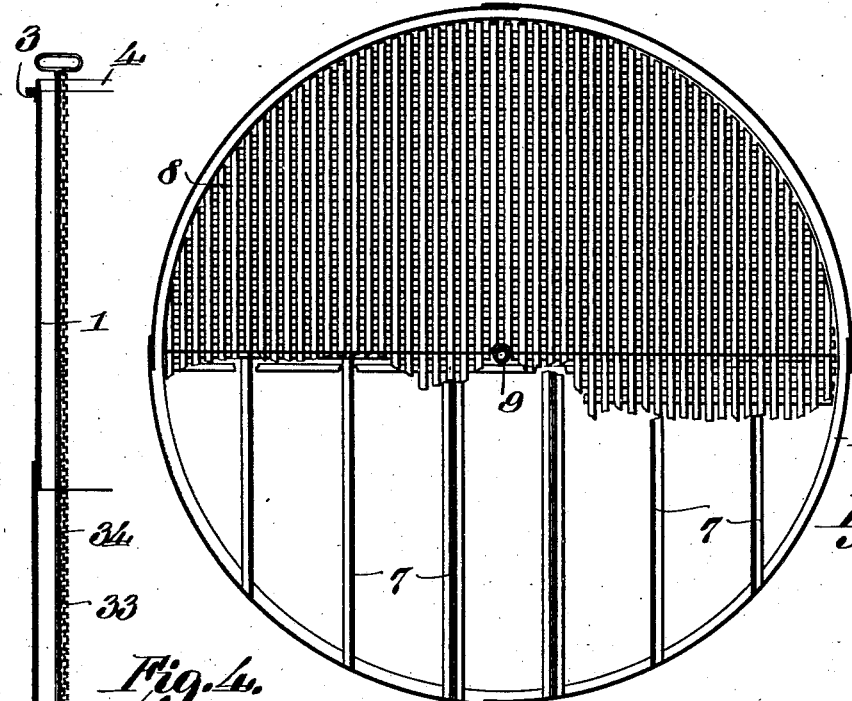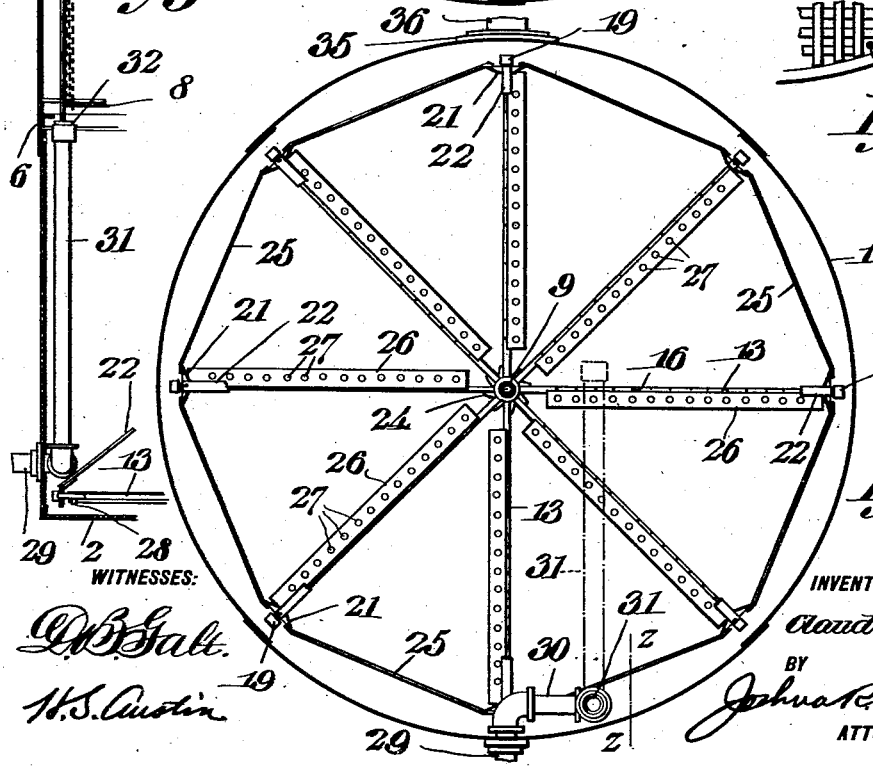

C. W. EWING.
CHEMICAL MIXER.
APPLICATION FILED APR. 30, 1913.
1,111,788.
Patented Sept. 29, 1914.
3 SHEETS—SHEET 3.
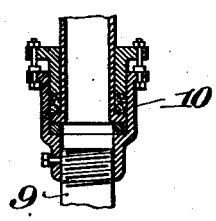
Fig. 9.
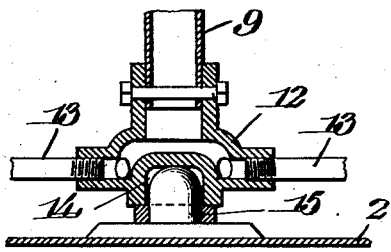
Fig. 11.
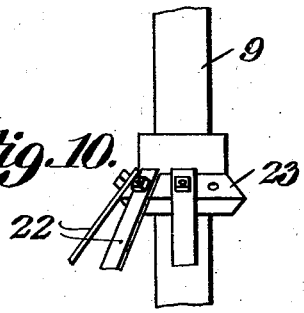
Fig. 10.
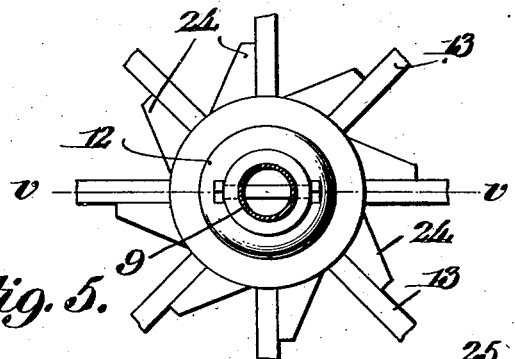
Fig. 5.
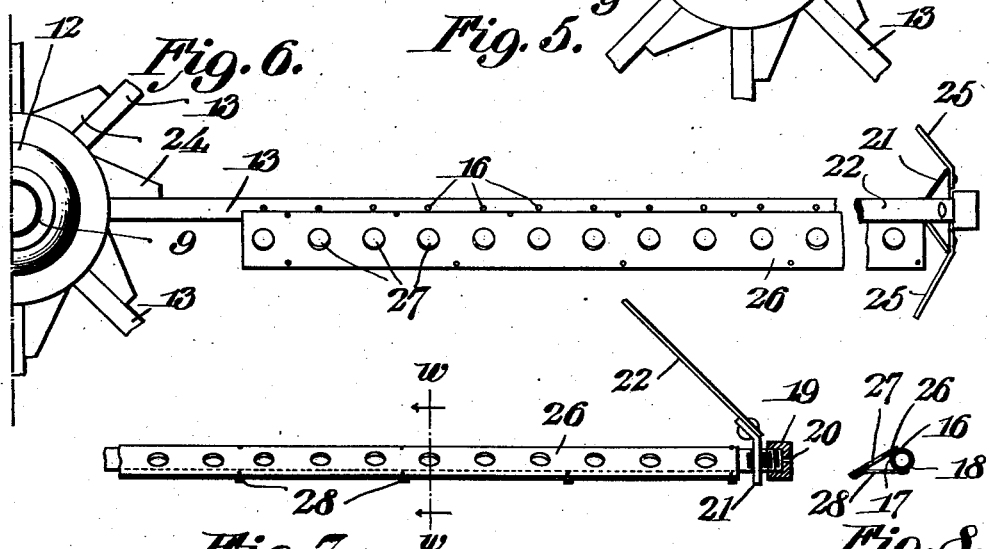
Fig. 6.
Fig. 7.    Fig. 8.
WITNESSES:    INVENTOR
Claud W. Ewing.
BY
Joshua R H Potts
ATTORNEY

UNITED STATES PATENT OFFICE.

CLAUDE WILSON EWING, OF TOLEDO, OHIO.

CHEMICAL-MIXER.

1,111,788. Specification of Letters Patent. Patented Sept. 29, 1914.

Application filed April 30, 1913. Serial No. 764,553.

*To all whom it may concern:*

Be it known that I, CLAUDE W. EWING, a citizen of the United States, residing at Toledo, county of Lucas, and State of Ohio, have invented certain new and useful Improvements in Chemical-Mixers, of which the following is a specification.

My invention relates to chemical apparatus and particularly to chemical mixers adapted for use in the manufacture of certain chemical products.

The device embodying my invention consists generally in a tank or receptacle divided by a horizontal grating or screen into an upper reservoir to contain the raw materials and a lower agitating chamber. An agitator is arranged in the lowermost chamber and steam supplied thereto which rises through the grating or screen and acts upon the material in the reservoir disintegrating and initially mixing the same, the disintegrated and mixed materials dropping through the grating into the lower agitating chamber where it is further acted upon by the steam and the agitator. The resultant mixture in the lower chamber, will usually consist of a chemical solution and a precipitate, the latter settling to the bottom of the agitating chamber after the operation of the agitator has been stopped.

The object of my invention is to provide a device of the class mentioned from which the solution may be readily decanted or drawn off from the precipitate.

A further object of my invention is to provide a device of the class mentioned equipped with means for drawing off the solution and further provided with means for preventing the solid matter from entering the first mentioned means while the machine is in operation.

A further object of my invention is to provide a device of the class under consideration which shall be of simple construction and operation and which may be readily cleaned when necessary or desirable.

A further object of my invention is to provide an improved agitator for thoroughly agitating and mixing the materials in the agitating chamber.

Other objects will appear hereinafter.

With these objects in view my invention consists generally in a mixer and agitator as above specified provided with a drain or decanting pipe swiveled therein and having its free end open and means for raising and lowering the open end of the pipe.

My invention further consists in a device as specified further characterized by means for closing the open end of the above mentioned pipe when the device is in operation.

My invention further consists in a device as stated provided with an agitator comprising a vertically disposed steam pipe extending to the bottom of the agitator chamber and rotatably mounted therein, radially disposed branch pipes secured to the first said pipe adjacent its lower end and provided with a plurality of perforations and blades fixed to said branch pipes.

My invention further consists in various details of construction and arrangements of parts all as will be fully described hereinafter and particularly pointed out in the claims.

My invention will be more readily understood by reference to the accompanying drawings forming a part of this specification and in which—

Figure 1 is a central vertical transverse section of a chemical mixer embodying my invention in its preferred form, Fig. 2 is a horizontal section on the line $x$—$x$ of Fig. 1 illustrating the grating or screen and a portion of the screen being broken away to illustrate the supporting means for the same, Fig. 3 is a horizontal section on the line $y$—$y$ of Fig. 1, Fig. 4 is a detail vertical section on substantially the line $z$—$z$ of Fig. 3, the drain pipe being illustrated in raised or inoperative position, Fig. 5 is a plan view of the hub of the agitator, Fig. 6 is a plan view of a portion of the hub of the agitator and one of the agitator arms, Fig. 7 is a front elevation of one of the agitator arms, Fig. 8 is a section on the line $w$—$w$ of Fig. 7, Fig. 9 is a detail of the stuffing box the connection between the steam supply pipe and the vertical steam pipe of the agitator, Fig. 10 is a detail view illustrating the upper ends of the agitator arm braces, Fig. 11 is a vertical section on substantially the line $v$—$v$ of Fig. 5, and Fig. 12 is a detail view.

Referring now to the drawings 1 indicates the body of the device which comprises a cylindrical shell open at the top and provided with a bottom 2. The upper edge of the body or shell 1 is preferably reinforced with an angular member 3 to which is secured a transversely extending member 4 having bearings 5 to support the steam pipe hereinafter described. At substantially one third of the height of the device from the bottom, is an internal annular flange 6 upon which rest the ends of a plurality of transverse angle members 7 to support a grating or screen 8. The grating or screen 8 is composed of a plurality of steel rods arranged in two layers with those in each layer at right angles to those in the other and suitably secured together. The screen or grating is preferably formed in two parts for a purpose which will appear hereinafter, the same being divided diametrically. The screen divides the shell into an upper chamber or reservoir to receive the raw materials, and a lower agitating chamber.

The agitator comprises a vertically disposed rotary steam pipe 9 connected at its upper end by a stuffing box 10 to a steam supply pipe 11, a hub 12 at the lower end of the pipe 9, and a plurality of radially disposed branch pipes 13 extending from the hub 12 and at a short distance above the bottom 2 of the device. The lower face of the hub 12 is formed with a socket 14 to receive a stud 15 projecting upwardly from the bottom 2 and said stud 15 and the bearing 5 form journal bearings for the agitator. Each of the branch pipes 13 is provided with three series of perforations, 16, 17 and 18, one series, 16, extending upwardly and the others radially downwardly as illustrated clearly in Fig. 8 of the drawings. The end of each of the pipes 13 is closed by a cap 19 provided with a centrally disposed perforation or aperture 20. A bracket 21 is threaded upon the end of the pipe 13 before applying the cap 19 and a brace 22 extends from the bracket 21 to a conical collar 23 fixed to the pipe 9 below the grating 8. The hub 12 is provided with a boss or lug 24 directly behind each of the pipes 13 where they enter the hub to brace the same and the several brackets 21 at the ends of the pipes 13 are connected by peripheral brace rods 25. A blade 26 is secured to each of the pipes 13 in advance of the series of apertures 16 and extends forwardly and downwardly therefrom. The blade 26 is provided with a plurality of apertures 27 and is supported by a plurality of braces 28 fixed to the under side of the pipe and to the outer forward edge of the blade.

Extending through the side of the casing 1 adjacent the bottom and slightly above the lower portion of the agitator is a drain pipe 29 which is off-set at 30 and to the end of which is swiveled a decanting pipe or tube 31 which may be raised into vertical position as shown in Fig. 4 when the device is in operation or lowered as shown in Fig. 3 when it is desired to withdraw the solution or clear liquid from the device. The pipe 31 is open at its free end and is of such length that its free end is directly beneath the grating 8 when raised into vertical position. When the pipe is raised into vertical position it is closed by a plug 32 to prevent material dropping from the grating into the open end, and said plug is arranged upon the end of a handled rod 33 which is of sufficient length to reach from the top of the device to the mouth of the pipe. A chain 34 is provided for raising and lowering said pipe. In using the device the pipe 31 is first raised into vertical position and closed by means of the plug and the grating 8 is then placed in position, said grating serving to hold the pipe in raised position by engaging the rod 33 as shown in Fig. 12. It is to facilitate removing and replacing the grating 8 that the same is made in two parts as above described.

A manhole 35 is provided to give access to the interior of the agitating chamber for the purpose of cleaning and a pipe 36 leads into said chamber below said manhole for the same purpose.

Fixed to the upper end of the pipe 9 below the stuffing box 10 is a beveled gear 37 meshing with a gear 38 on a horizontal shaft 39 mounted in brackets 40 fixed to the transverse member 4 and suitable means are provided for driving the shaft 39.

The operation of the device is as follows: The pipe 31 is first raised into vertical position, plugged, and the grating 8 placed upon the supporting members 7. The raw material is then supplied to the device resting upon the grating 8. Steam is then admitted through the pipes 11 and 9 to the agitator and the latter rotated by means of the gearing above mentioned. The steam rises through the grating and acts upon the material to disintegrate and initially mix the same and the disintegrated and partially mixed material drops through the grating into the agitating chamber where it is mechanically acted upon by blades of the agitator and further acted upon by steam supplied therethrough. At the end of the operation the agitator is stopped and the steam supply shut off and the mixture in the lower chamber allowed to settle. The plug is then removed from the end of the decanting pipe and the latter is lowered to draw off the clear liquid above the precipitate.

Having described my invention, I claim:

1. A mixing apparatus, comprising a casing, a grating dividing said casing into upper and lower chambers, the upper chamber constituting a magazine and the lower an agitating chamber, an agitator in the lower chamber and means for supplying steam to said agitator, substantially as described.

2. In a mixing apparatus, a casing, a grating dividing said casing into upper and lower chambers, the upper chamber constituting a magazine and the lower an agitating chamber, an agitator in said lower chamber and means for supplying steam to said lower chamber, substantially as described.

3. In a mixing apparatus, a casing, a grating dividing said casing into upper and lower chambers, an agitator in the lower chamber, means for supplying steam to said lower chamber, a drain pipe, and a decanting pipe swiveled to the end of said drain pipe, substantially as described.

4. In a mixing apparatus, a casing, and an agitator therein, said agitator comprising a vertically disposed rotary steam pipe, a hub on the lower end of said pipe, a plurality of radially disposed branch pipes, each provided with a plurality of perforations and an angularly disposed blade fixed to each of said branch pipes, the lower forward edges of said blades extending below the horizontal plane of the lower sides of said pipe and the upper edges extending above said pipes, substantially as described.

5. In a mixing apparatus, a casing, and an agitator therein, said agitator comprising a vertically disposed rotary steam pipe, a hub on the lower end of said pipe, a plurality of radially disposed branch pipes each provided with a plurality of perforations and an angularly disposed perforated blade fixed to each of said branch pipes, the lower forward edges of said blades extending below the plane of the lower faces of said pipes and the upper edges extending above said pipes, substantially as described.

6. In a mixing apparatus, a casing and an agitator, said agitator consising of a vertically disposed rotary steam pipe, a hub on the lower end of said pipe, a plurality of radially disposed branch pipes extending from said hub and each provided with a plurality of perforations and a boss on said hub back of the inner end of each of said branch pipes, substantially as described.

7. In a mixing apparatus, a casing, and an agitator therein, said agitator comprising a vertically disposed rotary steam pipe, a hub on the lower end of said pipe, a plurality of radially disposed branch pipes extending from said hub, a downwardly and forwardly inclined blade fixed to each of said branch pipes, and provided with a plurality of apertures, each of said branch pipes being provided with a series of perforations in its upper face and a series of perforations beneath said blade, means for supplying steam to said agitator and means for rotating the same, substantially as described.

8. In a mixing apparatus, an agitator comprising a vertically disposed rotary steam pipe, a plurality of radially disposed branch pipes extending therefrom, brackets fixed to said branch pipes adjacent their outer ends, a collar on said rotary pipe above said branch pipes, diagonally disposed brace rods connecting said brackets and said collar, and peripheral members connecting the brackets on the several branch pipes, substantially as described.

In testimony whereof I have signed my name to this specification in the presence of two subscribing witnesses.

CLAUDE WILSON EWING.

Witnesses:
AMANDUS CHRISTIE,
JOS. CHAMBERS.